(12) United States Patent
Harvey

(10) Patent No.: US 11,414,198 B2
(45) Date of Patent: Aug. 16, 2022

(54) AIRCRAFT PROPULSION SYSTEM

(71) Applicant: ROLLS-ROYCE plc, London (GB)

(72) Inventor: Giles E. Harvey, Derby (GB)

(73) Assignee: ROLLS-ROYCE PLC, London (GB)

( * ) Notice: Subject to any disclaimer, the term of this patent is extended or adjusted under 35 U.S.C. 154(b) by 552 days.

(21) Appl. No.: 16/546,362

(22) Filed: Aug. 21, 2019

(65) Prior Publication Data

US 2020/0070989 A1    Mar. 5, 2020

(30) Foreign Application Priority Data

Sep. 3, 2018    (GB) ..................................... 1814255

(51) Int. Cl.
| | | |
|---|---|---|
| *H02K 9/19* | (2006.01) | |
| *H02K 7/14* | (2006.01) | |
| *B64D 27/24* | (2006.01) | |
| *B64C 29/00* | (2006.01) | |

(52) U.S. Cl.
CPC .......... *B64D 27/24* (2013.01); *B64C 29/0025* (2013.01); *H02K 7/14* (2013.01); *H02K 9/19* (2013.01); *Y02T 50/60* (2013.01)

(58) Field of Classification Search
CPC .................................. H02K 7/14; H02K 9/19
USPC .................................. 310/54, 60 R, 216.121
See application file for complete search history.

(56) References Cited

U.S. PATENT DOCUMENTS

| | | |
|---|---|---|
| 1,879,142 A | 9/1932 | Egan |
| 3,729,957 A | 5/1973 | Petrie et al. |
| 3,861,139 A | 1/1975 | Jones |
| 7,410,122 B2 | 8/2008 | Robbins et al. |
| 7,765,786 B2 | 8/2010 | Klingels et al. |
| 2013/0174533 A1 | 7/2013 | Ribarov et al. |
| 2013/0181562 A1 | 7/2013 | Gieras et al. |
| 2016/0039529 A1* | 2/2016 | Buchmueller .......... B64C 11/00 244/65 |
| 2016/0099636 A1 | 4/2016 | Fricasse |
| 2018/0138761 A1 | 5/2018 | Niergarth et al. |

FOREIGN PATENT DOCUMENTS

| | | | |
|---|---|---|---|
| CN | 103004060 | * | 3/2013 |
| CN | 205256667 | | 5/2016 |
| CN | 107054597 | | 8/2017 |
| CN | 206939096 | | 1/2018 |
| CN | 206968956 U | | 2/2018 |
| DE | 3834511 | | 4/1990 |
| DE | 202005020124 | * | 5/2006 |
| DE | 102011084360 | | 4/2013 |

(Continued)

OTHER PUBLICATIONS

Great Britain search report dated Feb. 21, 2019, issued in GB Patent Application No. 1814255.4.

(Continued)

*Primary Examiner* — Jose A Gonzalez Quinones
(74) *Attorney, Agent, or Firm* — Barnes & Thornburg LLP; John Thomas Routon

(57) ABSTRACT

An aircraft propulsion system comprises a vertical lift propulsor mounted within a wing of the aircraft. The vertical propulsor comprises an electric motor comprising a rotor mounted to a plurality of propulsor blades, the motor further comprising a stator. The rotor is provided radially outwardly of the stator.

8 Claims, 4 Drawing Sheets

(56) References Cited

FOREIGN PATENT DOCUMENTS

| DE | 10201607428 | | 11/2017 | |
|----|----|----|----|----|
| EP | 1777369 | | 4/2007 | |
| EP | 2551198 | | 1/2013 | |
| EP | 3290334 | | 3/2018 | |
| EP | 3300231 | | 3/2018 | |
| EP | 3367540 | | 8/2018 | |
| ES | 2288083 | A1 * | 12/2007 | ............ B64C 15/00 |
| WO | 2014021798 | | 2/2014 | |
| WO | 2016020915 | | 2/2016 | |
| WO | 2018065709 | | 4/2018 | |

OTHER PUBLICATIONS

Great Britain search report dated Feb. 25, 2019, issued in GB Patent Application No. 1814256.2.
Great Britain search report dated Mar. 4, 2019, issued in GB Patent Application No. 1814869.2.
European Search report dated Feb. 13, 2020, issued in EP Patent Application No. 19189980.
European Search report dated Feb. 18, 2020, issued in EP Patent Application No. 19189981.
European Search report dated Feb. 19, 2020, issued in EP Patent Application No. 19189982.
European Office Action dated May 12, 2021 in connection with EP Appln. No. 19189980.6, 4 pages.

* cited by examiner

AIRCRAFT PROPULSION SYSTEM

CROSS-REFERENCE TO RELATED APPLICATIONS

This application is based upon and claims the benefit from priority British Patent Application No. 1814255.4 filed 3 Sep. 2018 the entire contents of each of which are incorporated herein.

BACKGROUND

Technical Field

The present disclosure concerns a propulsion system for an aircraft.

Description of the Related Art

Vertical Take-Off and Landing (VTOL) aircraft have been proposed, which seek to be able to both take-off and land vertically. One known method for VTOL operation is to provide one or more vertically oriented ducted fans. One specific example is the Ryan XV-5 Vertifan, which used vertically oriented fans provided within each wing, with a further fan provided in a forward end of the fuselage, to provide vertical lift during take-off and landing. These fans would be covered by aerodynamic fairings during cruising flight to reduce drag.

However, in order for such arrangements to be commercially viable, the lift devices must be power dense (both in terms of volume and weight) to minimise drag and weight, in order to maximise range and minimise operating cost. The fans must also be highly efficient. Noise (both during hover and cruise flight) is also an issue. Consequently, the present invention provides a vertical lift fan aircraft which seeks to address some or all of these problems.

SUMMARY

According to a first aspect there is provided an aircraft propulsion system comprising:
a vertical lift propulsor mounted within a wing of the aircraft;
wherein the vertical propulsor comprises an electric motor comprising a rotor mounted to a plurality of propulsor blades, the motor further comprising a stator; and wherein the rotor is provided radially outwardly of the stator.

Advantageously, the electric motor can be provided in the same plane as the rotor blades of the vertical lift propulsor. Consequently, the axial length of the vertical lift propulsion system is minimised, thereby allowing the vertical lift propulsion system to fit within the thickness of the wing. Consequently, drag is minimised, and an efficient, thin wing aerofoil can be provided.

The motor may comprise a permanent magnet motor in which the rotor comprises a plurality of permanent magnets.

The propulsion system may comprise one or more struts which each extend between the wing and the electric motor stator.

The stator may be liquid cooled. The struts may comprise liquid cooling channels which may communicate with liquid cooling channels of the stator. Advantageously, the struts provide both structural support for the stator and cooling for the stator windings. Consequently, weight is reduced, as additional liquid to air heat exchangers need not be provided. Furthermore, the hub diameter may be reduced in view of the increased cooling and reduced requirement for stator mounted heat exchangers, thereby increasing the airflow for a given fan diameter, and so reducing the overall size of the propulsion system.

The struts may be located downstream of the propulsor blades. Advantageously, the struts reduce exit swirl, and so increase fan efficiency. Consequently, the struts provide two or in some cases three separate functions.

Optionally, struts may be located upstream of the propulsor blades.

The propulsor blades may be mounted to the electric motor rotor by an annular disc. The rotor permanent magnets may be mounted to a radially inner side of the annular disc. Advantageously, the rotor permanent magnets are held in place against the annular disc by centrifugal force. Consequently, a small air gap can be provided between the stator and rotor, thereby increasing electric motor efficiency and power density.

The propulsion system may comprise a central static bearing mount, which may extend through a centre of the stator, between an axially forward face and an axially rearward face of the stator. The central static bearing mount may mount a bearing. The propulsion system may comprise a radially extending web which extends between the motor rotor and the bearing. Advantageously, the motor rotor is supported by a bearing provided radially inwardly of the rotor. Consequently, the size and circumferential speed of the bearing is reduced, thereby reducing wear, increasing efficiency, and reducing size.

Propulsion system may comprise a forward web extending between the motor rotor and the bearing at an upstream side of the stator, and a rearward web extending between the motor rotor and the bearing at a downstream side of the stator.

The bearing mount may comprise a liquid cooling channel in fluid communication with liquid cooling channels of one or more radially extending web. The or each radially extending web may comprise a coolant nozzle configured to provide coolant to one or more stator coil. Advantageously, liquid coolant (such as oil) can be provided to the stators by centrifugal force provided by the spinning radially extending web. This coolant can optional then be passed to the structural supports for cooling, before returning to the bearing mount for reuse. Consequently, a full pumped cooling/oil system is provided, which provide cooling and/or lubrication to the bearings and stators without the need for additional pumps, radiators or channels.

According to a second aspect, there is provided an aircraft comprising a propulsion system in accordance with the first aspect mounted within a wing of the aircraft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
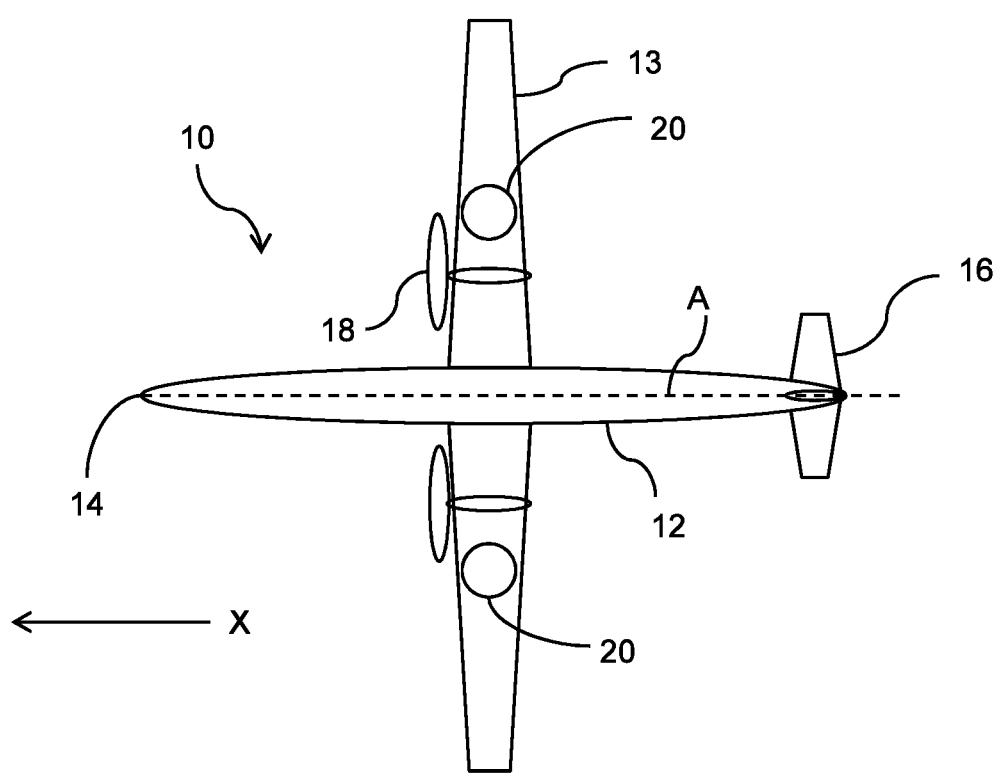
FIG. 1. is a plan view of an aircraft.

With reference to FIG. 1, an aircraft 10 is shown. The aircraft 10 comprises a fuselage 12 having a nose 14 and a tail 16. An aircraft centreline A runs from the tail 16 to the noise 14. The aircraft 10 has wings 13, to which a propulsion system is mounted.

The propulsion system optionally comprises separate lift 20 and cruise 18 systems. The cruise system comprise a pair of horizontally mounted propulsors in the form of propellers 18, which have rotational axes parallel to the aircraft centreline A. A propeller 18 is mounted to each wing 13, to provide thrust in a forward direction X.

Figure 2:
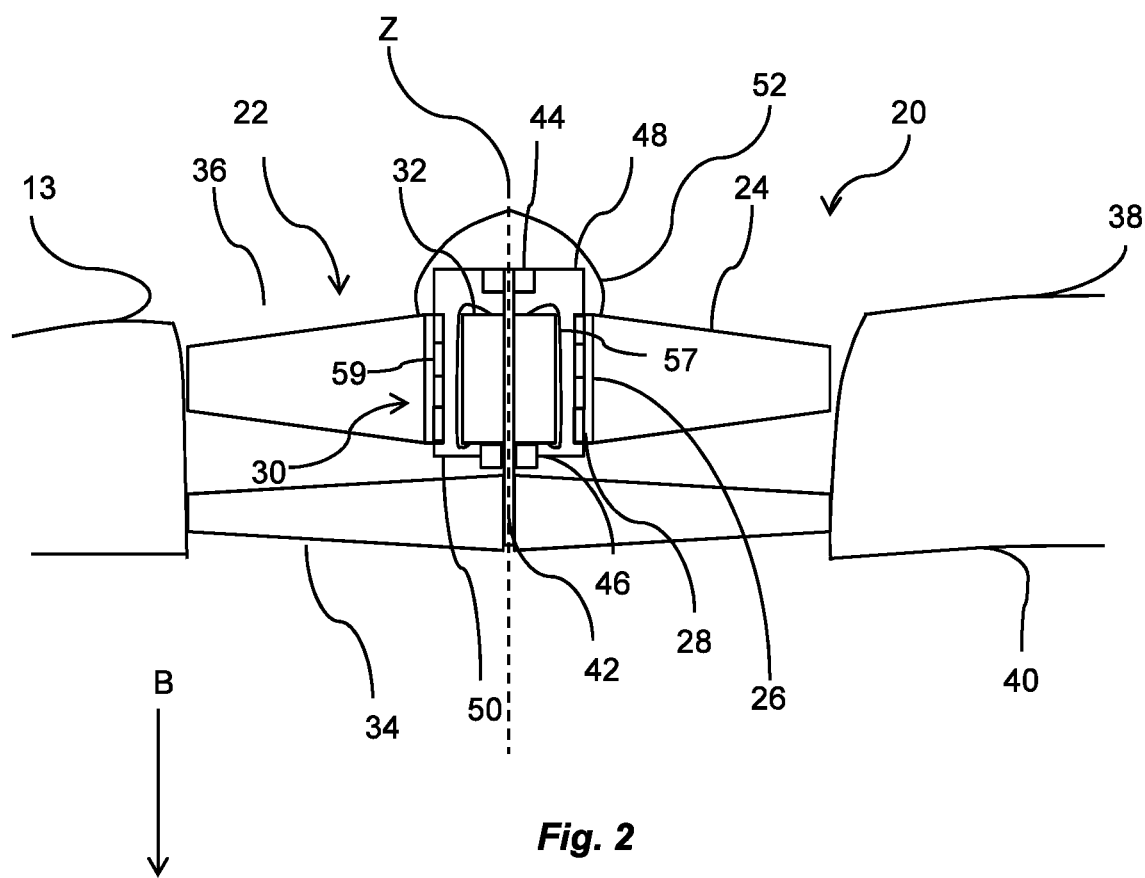
FIG. 2 is a sectional side view of a propulsion system of the aircraft of FIG. 1.
Figure 3:
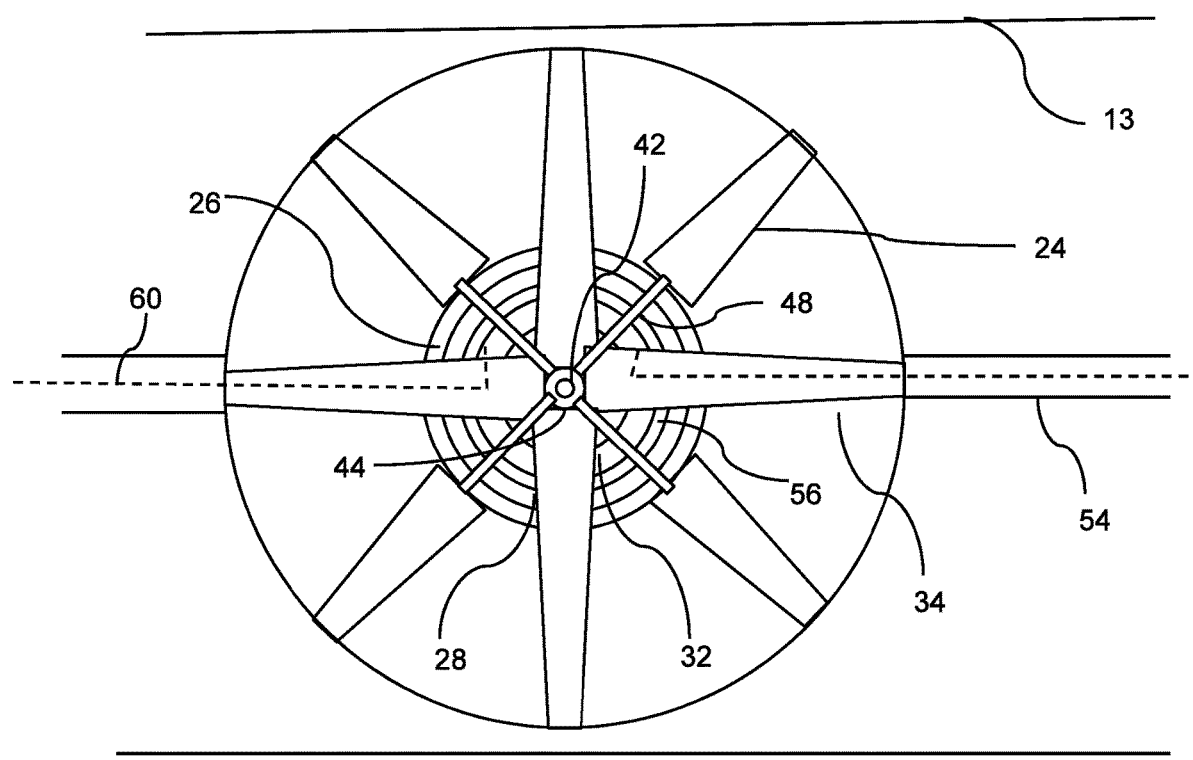
FIG. 3 is a similar view to FIG. 2, showing coolant flows through the propulsion system.

The lift system 20 is shown in further detail in FIGS. 2 and 3. The lift system comprises a pair of vertical propulsors comprising vertically orientated wing mounted fans 22. In the present embodiment, a pair of fans 22 is provided, with each being provided on a respective wing 13, either side of the centreline A. each fan 22 is provided within an aperture 36 which extends through the wing 13, from an upper surface 38 to a lower surface 40. The fan 22 is arranged to rotate about a vertical axis Z such that, in use, the fan 22 provides propulsive thrust in a downward direction B when the aircraft is in level flight or on level ground. Consequently, the downward direction B also defines a downstream direction parallel to the downward direction, and an upstream direction opposite to the downstream direction B.

The fan 22 comprises a plurality of blades 24, which are each attached to a generally propulsor rotor disc in the form of annular ring 26. The ring 26 is in turn mounted to a rotor 28 of an electric motor 30. The electric motor 30 is in the form of a permanent magnet AC motor, and so comprises permanent magnets 59 mounted to a radially inner side of the ring 26, which rotate with the rotor 28. The motor 30 further comprises a stator 32 comprising a plurality of stator windings 57, which are separated from the rotor 28 by an air gap 56. In use, each winding 57 is energised by electrical current provided by cables 60, which pass through the struts to the windings 57 to produce a magnetic field. This magnetic field interacts with the magnetic field produced by the permanent magnets 59 to produce torque, which turns the fan blades 24 to produce thrust.

As can be seen in FIGS. 2 and 3, the stator 32 is mounted radially inward of the rotor 28. Consequently, each of the stator 32, rotor 28 and fan 22 can be provided in the same plane, and consequently, the fan arrangement is axially short. This is important for several reasons. Firstly, if the fan arrangement where to have a longer length, at least part of the fan arrangement would project either above the wing upper surface 38, or below the wing lower surface 30 in cruise. This would interfere with the efficient production of lift by the wing, and thereby increase drag and/or require a greater wing area. Consequently, the aircraft would be less efficient. Secondly, the motor would require a longer shaft, which may be heavier, and required heavier structure to mount the bearing. Furthermore, it has been found that the radially inner part of the fan provides relatively little thrust at a given fan rotational speed. Consequently, increasing the diameter of the hub has relatively little effect on the mass flow of air through the fan for a given fan outer diameter and fan rotational speed, and so a larger diameter motor is preferable to a longer axial length motor.

The stator 32 is mounted to the aircraft by a plurality of structural struts 34. Each of the struts 34 is provided downstream of (i.e. below) the fan 22, and is aerodynamically profiled to straighten fan flow. Consequently, each strut 34 acts as an outlet guide vane (OGV), thereby increasing propulsive efficiency of the fan 34. Two of the struts may comprise an extension of the main wing spar 54. In some cases, the struts 34 may be tilt-able, to adjust their angle of attack relative to the flow from the upstream fans 22, i.e. they may be variable pitch.

Each strut 34 extends between the wing 13 to a central static bearing mount 42. The bearing mount 42 comprises an elongate member, which extends from a downstream, lower face of the stator 32, through a central passage of the stator, to an upstream, upper face of the stator 32. The stator 32 is mounted to the central static bearing mount 42, to provide structural support and to prevent rotation of the stator 32.

The central static bearing mount 42 also mounts upper and lower main bearings 44, 46. The main bearings 44, 46 provide rotational support for the motor rotor 28 via upper and lower webs 48, 50. The webs 48, 50 extend between the rotor 28 and the upper and lower bearings 44, 46 respectively, around the stator 32. Consequently, the rotor bearings 44, 46 are provided relatively radially inwardly, at a small diameter, and so rotate relatively slowly compared to the rotational speed of the rotor 28. This may reduce bearing wear, and also reduces the size (and so weight) of the bearings 44, 46. An aerodynamic fairing 52 covers at least the upper webs 48, and may rotate with the rotor 28. The bearing arrangement is also relatively stiff, since bearings 44, 46 are provided at both the upper and lower ends of the rotor 28. Consequently, a relatively small air gap 56 can be maintained, thereby improving rotor efficiency and power density.

Figure 4:
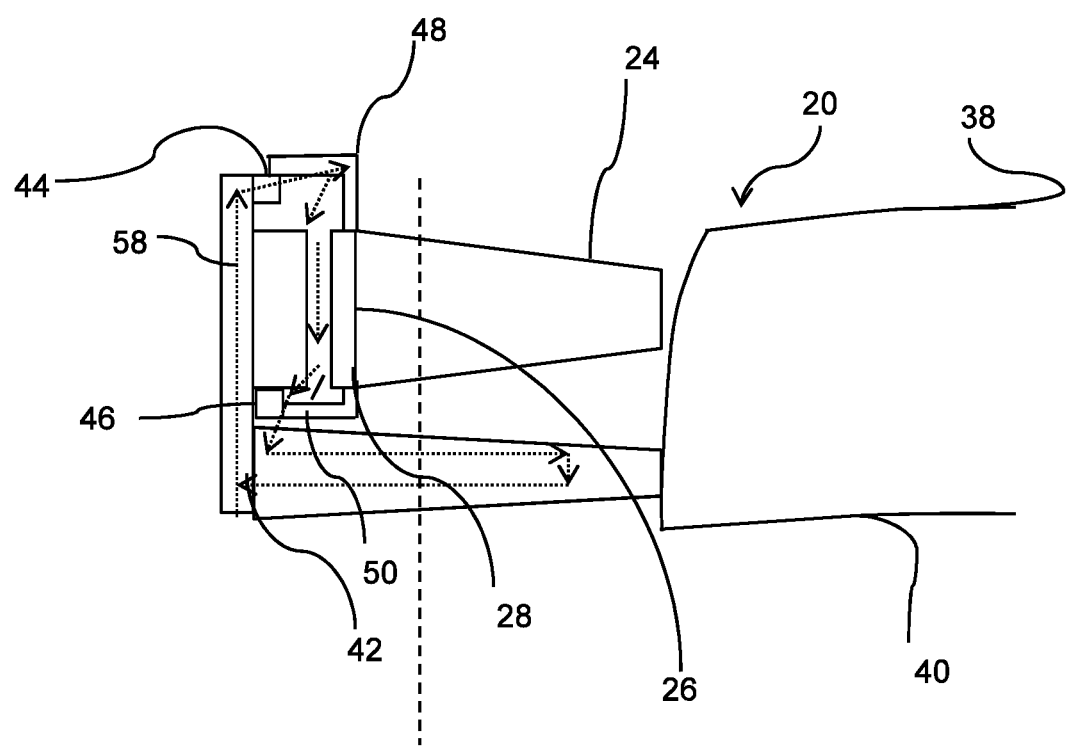
FIG. 4 is a plan view of the propulsion system of FIGS. 2 and 3.

The vertical lift system further comprises a cooling/lubrication system, shown in detail in FIG. 4. The system comprises channels in the form of coolant passages (shown as dotted lines 58) which extend through the struts 34, bearing mount 42, front and rear main bearings 44, 46 and webs 48, 50. The flow through the coolant passages 58 is as follows. Starting from the struts 34, the coolant flows radially inward toward the bearing mount 42, upward through the bearing mount toward the forward bearing 44, through the forward bearing 44, before entering the forward web 48. The coolant is then centrifuged radially outwardly by the web 50, before being sprayed onto the stator 32 by spray bars to cool the windings. In view of the centrifuging action of the rotating rotor, the coolant is pumped automatically, without a requirement for a further pump. Optionally, a pump may be provided, but the pump will generally have a lower power than would otherwise be required. As the coolant cycles through the components, the stator 23 and both the bearings 44, 46 are cooled and/or lubricated. Meanwhile, the struts 32, which are located in the downstream flow path of the fan 22, acts as radiators to cool the oil. In view of the heat added to the airflow, some additional thrust is also created.

Alternatively or in addition, direct air cooling of the stator 32 may be provided. As can be seen from FIG. 3, the webs 48, 50 are in the form of elongate spokes, such that air gaps are provided between the spokes. The spokes may be aerodynamically profiled to provide additional forcing, i.e. they may act as fans. The spokes webs 48, 50 allow air from upstream of the fan 22 to pass through the stator windings, thereby providing an additional or alternative source of cooling. Alternatively, the webs 48, 50 may be in the form of solid discs, to encapsulate the motor.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the motor could be of a different type, for example a doubly wound rotor, having armature windings.

The propulsion system may comprise a cruise system comprising located at locations other than the wings, such as the tail or forward fuselage. Similarly, the aircraft may be of a blended wing type, in which distinct wings and fuselage are not provided, but rather the fuselage provides at least a portion of the list. Different numbers of vertical and cruise propulsors may be provided.

The invention claimed is:

1. An aircraft propulsion system comprising:
   a vertical lift propulsor mounted within a wing of the aircraft;
   wherein the vertical propulsor comprises an electric motor comprising a rotor mounted to a plurality of propulsor blades, the motor further comprising a stator; and wherein
   the rotor is provided radially outwardly of the stator,
   wherein the propulsion system comprise one or more struts which each extend between the wing and the electric motor stator,
   wherein the struts comprise liquid cooling channels which communicate with liquid cooling channels of the stator.

2. A propulsion system according to claim 1, wherein the motor comprises a permanent magnet motor in which the rotor comprises a plurality of permanent magnets.

3. A propulsion system according to claim 1, wherein the stator is liquid cooled.

4. A propulsion system according to claim 1, wherein the struts are located downstream of the propulsor blades.

5. A propulsion system according to claim 1, wherein the propulsor blades are mounted to the electric motor rotor by an annular disc.

6. A propulsion system according to claim 2, wherein the rotor permanent magnets are mounted to a radially inner side of the annular disc.

7. An aircraft propulsion system comprising:
   a vertical lift propulsor mounted within a wing of the aircraft;
   wherein the vertical propulsor comprises an electric motor comprising a rotor mounted to a plurality of propulsor blades, the motor further comprising a stator; and wherein
   the rotor is provided radially outwardly of the stator,
   wherein the propulsion system comprises a central static bearing mount,
   wherein the central static bearing mount extends through a centre of the stator, between an axially upper face and an axially lower face of the stator,
   wherein the central static bearing mount mounts a bearing, and the propulsion system comprises a radially extending web which extends between the motor rotor and the bearing,
   wherein the bearing mount comprises a liquid cooling channel in fluid communication with liquid cooling channels of one or more radially extending web.

8. An aircraft comprising a propulsion system according to claim 1.

* * * * *